United States Patent [19]

Jungclaus et al.

[11] Patent Number: 4,502,651
[45] Date of Patent: Mar. 5, 1985

[54] DEVICE FOR PREVENTING BUZZ IN SUPERSONIC INTAKES OF AIR-BREATHING REACTION ENGINES, PARTICULARLY, RAM JET ENGINES

[75] Inventors: Günther Jungclaus, Munich; Ernst-Otto Krohn, Lohmar, both of Fed. Rep. of Germany

[73] Assignee: Messerschmitt-Bölkow-Blohm GmbH, Fed. Rep. of Germany

[21] Appl. No.: 432

[22] Filed: Jan. 2, 1979

[30] Foreign Application Priority Data

Jan. 12, 1978 [DE] Fed. Rep. of Germany ..... 28011190

[51] Int. Cl.$^3$ .............................................. F02C 7/04
[52] U.S. Cl. .................................. 244/53 B; 137/15.1
[58] Field of Search ............................. 137/15.1, 15.2; 244/53 B

[56] References Cited

U.S. PATENT DOCUMENTS 3,477,455 11/1969 Campbell ........................... 137/15.1
3,667,704 6/1972 Assmann ......................... 137/15.1 X Primary Examiner—Stephen C. Bentley
Attorney, Agent, or Firm—McGlew and Tuttle

[57] ABSTRACT

A device, particularly for use with guided missiles, of a type having an intake pipe which is not fully rotationally symmetrical and is particularly semi-rotationally symmetrical, having particularly a semi-rotationally symmetrical air intake cross-section. The device prevents hum in the supersonic intakes of air-breathing reaction engines, particularly, ram jet engines, of a type which are operated with solid fuels and without regulation of the amount of air intake, the amount of fuel or the amount of thrust current flow for driving guided missiles. The construction includes a missile body having an intake pipe mounted thereon with a front opening disposed in an opening plane defining an inlet. A displacement body is mounted within the pipe in spaced relationship thereto and has a front pointed end which extends outwardly beyond the intake plane and which projects into the incoming air flow. At least one air outlet port is provided in the displacement pipe ahead of the inlet plane which is advantageously arranged to deflect the incoming air in a direction toward the boundary layer flow of a boundary layer plow which extends between the displacement body and the missile body.

4 Claims, 2 Drawing Figures

DEVICE FOR PREVENTING BUZZ IN SUPERSONIC INTAKES OF AIR-BREATHING REACTION ENGINES, PARTICULARLY, RAM JET ENGINES

FIELD AND BACKGROUND OF THE INVENTION

This invention relates to internal combustion engines in general and, in particular, to a new and useful device for preventing buzz in supersonic intakes for air-breathing reaction engines, particularly, ram jet engines, operated with solid fuels without regulation of the amount of intake air, fuel, and thrust current, for driving guided missiles, having a not fully rotationally symmetrical, and particularly a semi-rotationally symmetrical air intake cross-section.

DESCRIPTION OF THE PRIOR ART

In airplanes and missiles flying at high Mach numbers, the supersonic diffusor transforms the high kinetic energy of the incoming air into pressure energy, while reducing its speed. In ram jet engines, this function is taken over by the supersonic diffusor alone and the air thus compressed then serves as combustion air in the combustion chamber.

The characteristic shock wave appearing on bodies in contact with supersonic currents are used in supersonic intakes for transforming kinetic energy into pressure energy. In supersonic intakes for airplane engines, several inclined shock waves appear successively, as well as a final shock wave perpendicular to the channel contours, behind which the supersonic flow prevails, whose velocity is further reduced in the following subsonic diffusor with a simultaneous pressure increase. As attractive as the transformation of pressure in a minimum of space by shock waves and the use of the phenomenon in supersonic flow may appear, it is still difficult today to stabilize the final shock waves in certain operating ranges of the supersonic diffusor in order to maintain the desired engine performance.

In supersonic diffusors, we distinguish between two operating states, namely, the "supercritical" operating state, where the final vertical shock wave is inside the diffusor, and the "subcritical" operating state, where the final shock wave moves ahead of the edge of the intake channel. The optimum operating point, namely, the maximum of the product of pressure by air throughput, where the former quantity is plotted in the operating diagram on the ordinate and the latter quantity on the absscissa, is exactly at the point of transition between the "sub-critical" and the "supercritical" operating state.

A particular disturbance of the oncoming air in supersonic diffusors is a phenomenon which is referred to in the industry as "buzz". This disturbance appears in the "subcritical" operating state. The vertical shock wave, which has already moved in front of the edge of the intake channel, has no stable position and moves back and forth unsteadily on the displacement body. This leads to great pressure fluctuations in the flow, and thus to a considerable drop of the mean pressure and of the air through it, (extinction of the combustion chamber in jet engines operating with liquid fuel, knocking out the flames in ram jet engines operating with solid fuel), and also the mechanical destruction of the air intake and miscible structure. For this reason, it is necessary to avoid the harmful "buzz" under any circumstances.

With conventional supersonic air intakes, this is achieved by arranging the layout point not in the optimum operating point mentioned above, but more into the supercritical range. This, as well as additional measures and means, such as, a variable geometry of the diffusor and control of the fuel dosage for the combustion chamber of the following engine and adjustment of the discharge nozzle, have the effect that, in a deviation from the layout point, for example, due to special flight maneuvers, the subcritical operating state, which is a prerequisite for the following "buzz" (vertical shock wave jumping back and forth on the displacement body), never appears. The above-mentioned measures and means, however, by deviating from the optimum operating point, create a power loss and represents additional costly expenditures, as well as an increase of the overall weight.

SUMMARY OF THE INVENTION

The present invention positively avoids the harmful "buzz" in supersonic diffusors by the use of a relatively simple device. According to the invention, means defining air passages including air outlet ports are provided in the displacement body ahead of the air intake pipe in respect to the direction of flow. In one embodiment of the invention, several air outlet ports are disposed at the air gap which is provided in a supersonic air intake between the inside of the air intake or of the displacement body and the outer contour of the missile adjoining it, and is bridged by a boundary layer plow. The air outlet ports are arranged in series in the displacement body in the direction of flow, and they extend in circumferential directions and open toward the boundary layer gap. The boundary layer plow is designed so that the pressure in the boundary layer gap is smaller than that on the surface of the displacement body and is at least smaller than the pressure behind the issuing vertical wave.

In a further development, these air outlet ports have a dovetailed cross-section according to the invention to ensure the uniformity of the outflow radially from the outside to the inside.

Another preferred embodiment of the invention comprises one or several air outlet channels or passages arranged in series in the displacement body, which extend in a circumferential direction and which are closed to the outside with a cover, or a so-called perforated plate, having a number of rows of inlet holes, and which open adjacent to the boundary layer gap. In many tests, this suggested measure has proven to be an effective means of preventing "buzz". Furthermore, the device, according to the invention, is simple in design, inexpensive to manufacture and saves additional weight.

Accordingly, an object of the invention is to provide an improved device in combination with a reaction engine mounted on a missile body for driving the missile, particularly for guided missiles of a type having a supersonic intake with an air intake pipe which is not fully rotationally symmetrical and having particularly a semirotationally symmetrical air intake cross-section and for preventing buzz in supersonic intakes of air-breathing reaction engines, particularly, for ram jet engines, which are operated with solid fuel without regulation of the amount of intake air, the amount of fuel and of the thrust current for driving guided missiles, which comprises, a missile body, an air intake pipe secured to said missile body, a displacement body mounted within the air intake pipe and having a front end extending ahead of the intake opening plane, and the displacement body including air passage means with at least one air outlet port defined in the displacement body provided ahead of the inlet plane.

A further object of the invention is to provide a device for preventing buzz in supersonic intakes of air-breathing reaction engines, particularly, ram jet engines, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
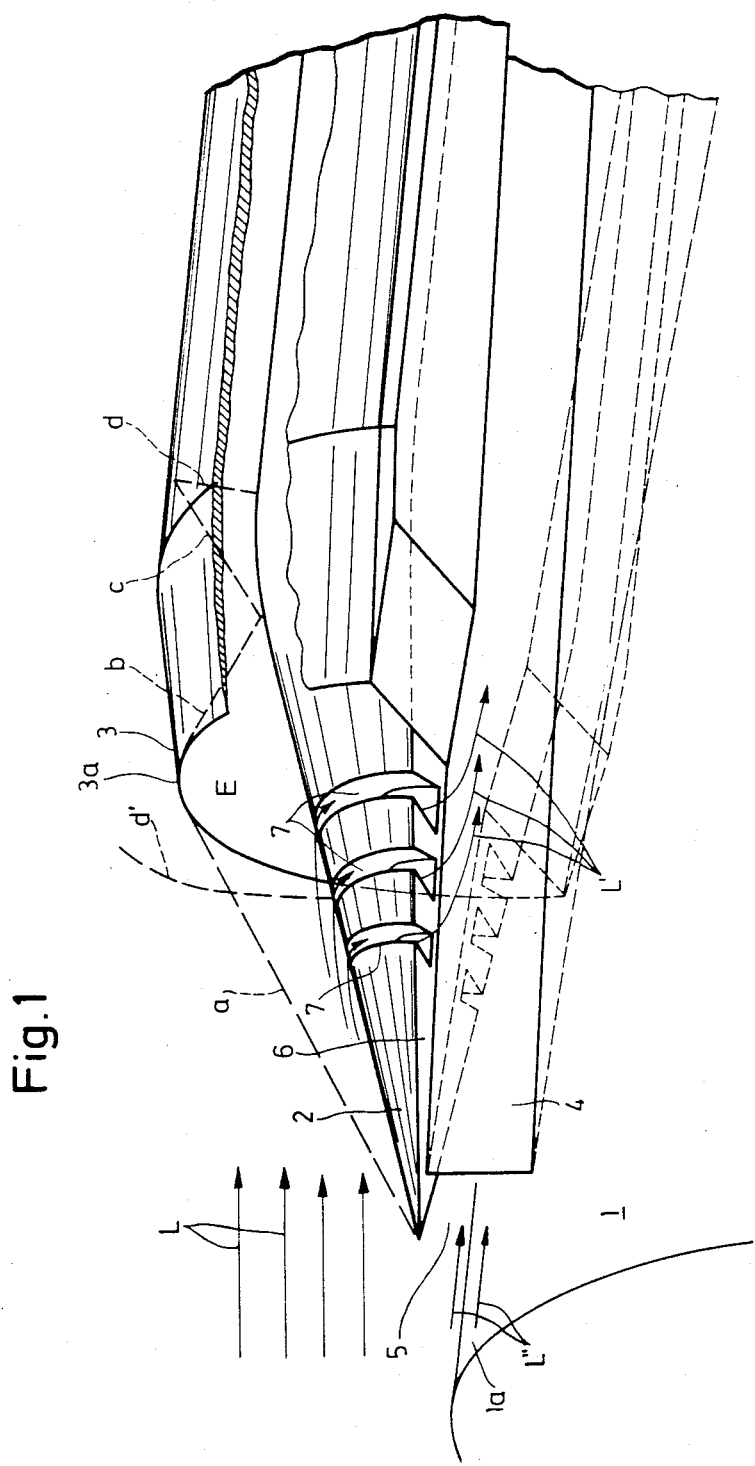
FIG. 1 is a partial elevational and partial sectional view of a missile having a supersonic air intake constructed in accordance with the present invention.

Referring to the drawing in particular, the invention embodied therein in FIG. 1, comprises, a missile or missile body, generally designated 1, having an air intake which includes an air intake pipe 3 mounted on the missile body 1 and having a displacement body 2 therein which projects outwardly beyond the intake opening plane E which is at a front edge 3a of the intake pipe 3. A boundary layer plow 4 is disposed between the displacement body and the missile body 1.

The semi-rotational supersonic air intakes arranged on the missile 1 comprise the displacement body 2, the air intake pipe 3 and the boundary layer plow 4 which bridges a free air gap 5 between a pointing plane surface 6 of the supersonic intake and the adjacent surface 1a of missile 1. In this way, the boundary layer current, which is harmful for the air intake, because it is heated and is less energy-rich, is bypassed. The boundary layer plow 4 is designed so that the boundary flow has a lower pressure than the flow on the surface of displacement body 2.

The air flow arriving at supersonic speed is designated by L. It is delayed in a known manner in the supersonic diffusor, and its kinetic energy is transformed into pressure energy in several, in this case, for example, three, successive inclined shock waves a, b and c, and finally in a vertical shock wave d. Behind the last or final shock wave d, the air speed is subsonic. In the laid-out operating range of the engine or of the supersonic intake, the shock waves a, b c and d assume the represented directions in a stable manner.

When the missile drops in its speed, e.g., by special flight maneuvers, or the oncoming flow conditions somehow deteriorate, the pressure diminishes, in the diffusor, and thus also the air throughput. The engine requires less air in this state, and the final shock wave indicated at d then moves in front of an edge 3a or an inlet plane E of air intake pipe 3. The air intake then works in the subcritical state, and the vertical thrust d' must be kept stable on displacement body 2.

Figure 2:
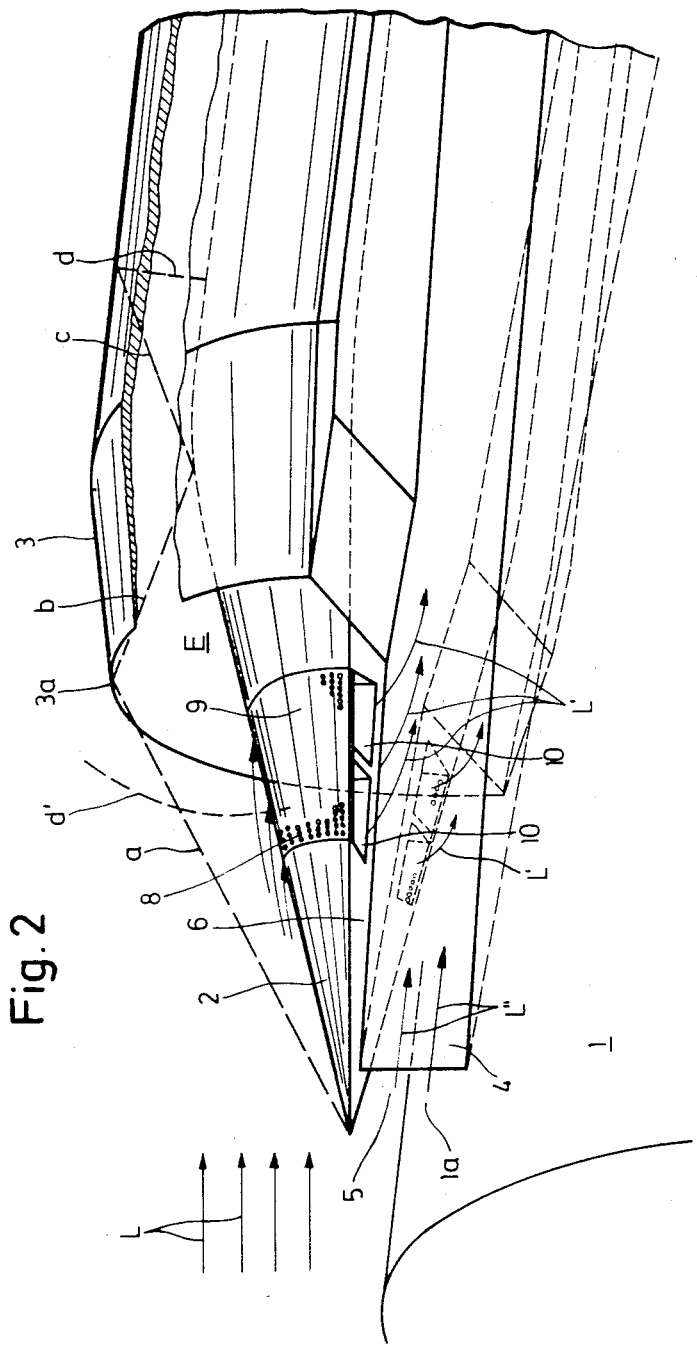
FIG. 2 is a view similar to FIG. 1 of another embodiment of the invention.

According to FIG. 1, a part L' of the air L flowing over displacement body 2 flows in the subcritical state through dovetailed cross-section air outlet ports 7 toward the boundary layer current designated L". The same phenomenon takes place, according to FIG. 2, through many small holes 8 in a cover or perforated plate 9, which closes two air outlet channels or passages 10 and 10' radially to the outside.

Due to the boundary layer flowing off in the critical regions of the inlet diffusor and displacement body 2 respectively ahead of inlet plane E, the issuing shock wave d' is stabilized here and buzzing is thus prevented.

While specific embodiments of the invention have been shown and described in detail to illustrate the application of the principles of the invention, it will be understood that the invention may be embodied otherwise without departing from such principles.

We claim:

1. In combination with a reaction engine mounted on a missile body for driving the missile of the type having a supersonic intake with air intake pipe which is not fully rotationally symmetrical and having particularly a semi-rotationally symmetrical air intake cross-section, a device comprising the intake pipe having a front inlet with an intake opening plane at the front of the intake pipe, a displacement body mounted on the missile body partly within said air intake in a spaced relationship with the intake pipe and the missile body and extending through said inlet plane, said dispacement body including air passage means with at least one air outlet port provided ahead of the intake pipe in respect to the direction of flow for passing air from above said displacement body to an air gap between said displacement body and said missile body.

2. A device as claimed in claim 1, further comprising a boundary layer plow extending from said missile body to said displacement body in the air gap, said at least one air outlet port comprising a plurality of air outlet slots arranged in series in the direction of flow along said displacement body, and said air passage means including air passages which extend in a circumferential direction of the displacement body and open toward said boundary layer plow, whereby, the pressure in the gap adjacent said boundary layer plow is less than on the surface of said displacement body and at least less than the pressure behind the issuing vertical shock wave.

3. A device as claimed in claim 2, wherein said air outlet slots have a dovetailed cross-section.

4. A device as claimed in claim 1, wherein said air passage means comprises a plurality of passages defined in said displacement body at spaced locations along its length and which extend circumferentially around said displacement body into the air gap between said displacement body and said missile body.

* * * * *